United States Patent [19]
Peng et al.

[11] Patent Number: 5,917,618
[45] Date of Patent: Jun. 29, 1999

[54] DOCUMENT MOVING TRANSMISSION SYSTEM FOR AN OPTICAL SCANNER

[75] Inventors: Henry Peng; Hocking Chen, both of Hsinchu; Ming-Tsan Lin, I-Lan, all of Taiwan

[73] Assignee: UMAX Data Systems, Inc., Hsinchu, Taiwan

[21] Appl. No.: 08/870,174

[22] Filed: Jun. 6, 1997

[51] Int. Cl.[6] .................................................. H04N 1/04
[52] U.S. Cl. ........................ 358/498; 358/487; 358/496
[58] Field of Search .................... 358/498, 497, 358/494, 496, 474, 487; 355/48, 50, 72, 75, 74; 399/363, 377, 379

[56] References Cited

U.S. PATENT DOCUMENTS

| | | |
|---|---|---|
| 5,390,008 | 2/1995 | Kuwahara ................................ 358/497 |
| 5,608,537 | 3/1997 | Manabe et al. .......................... 358/474 |
| 5,742,407 | 4/1998 | Albrecht et al. ........................ 358/496 |
| 5,790,278 | 8/1998 | Ehrne et al. ............................ 358/496 |
| 5,818,611 | 10/1998 | Shih ........................................ 358/498 |

*Primary Examiner*—Joseph Mancuso
*Assistant Examiner*—Hien Truong
*Attorney, Agent, or Firm*—W. Wayne Liauh

[57] ABSTRACT

A document moving transmission system for an optical scanner to drive the window assembly of a document moving optical scanner is disclosed. The transmission system consists several mechanism to account for providing the driving force, converting rotation into linear motion, performing the sliding motion with the window assembly, adjusting and maintaining flatness of the window assembly over the light transmitting slot inside the optical scanner housing.

4 Claims, 3 Drawing Sheets

DOCUMENT MOVING TRANSMISSION SYSTEM FOR AN OPTICAL SCANNER

BACKGROUND OF THE INVENTION (1) Field of the Invention

The invention relates to a document moving transmission system for an optical scanner, and more particularly to an optical scanner with mechanism for original document moving and capable of maintaining and adjusting surface flatness of the window assembly over the light transmitting slot of the optical scanner.

(2) Description of the Prior Art

Generally, for an optical scanner to have a satisfied resolution, it is quite important to reduce overall tolerance accumulated during manufacturing and assembling. In the case of an optical scanner with a document moving mechanism, the overall tolerance is not only essential, but the flatness of the window assembly over the light transmitting slot is also crucial. It is easy to understand that the movement of the window assembly over the optical scanner forms a dynamic system on top of the optical scanner. It is then inevitable that, after years usage, the fitting between components will become loosen more or less. Thus, on the sad side, the flatness of the window assembly over the light transmitting slot will lose as well; which will critically affect the resolution and quality of the imaging.

Moreover, no convenient way for flatness re-adjusting at field is available so far to meet necessary in-site maintenance. As long as the optical scanner leaves the assembly line, it is quite difficult to have the flatness of the window assembly calibrated. As a matter of fact, the looseness between components will prevail to a negative side, and make the maintaining of flatness over the window assembly unfeasible. Consequently, the deteriorating of imaging quality can be expected.

To overcome the possible misalignment issue, it is usually devoted to the manufacture process; such as increasing the machining accuracy and reducing the fitting tolerance. However, resort in these folds just implies a trade-off in cost-increasing, which might harm the sales. Therefore, a preferable way shall be determined to resolve the dilemma between the imaging accuracy and the competitiveness.

SUMMARY OF THE INVENTION

Accordingly, it is a primary object of the present invention to provide a document moving transmission system for an optical scanner, which the imaging accuracy will then be ascertained.

The present invention is applied to an optical scanner with document moving mechanism for adjusting and maintaining flatness of a window assembly over the light transmitting slot of the optical scanner, comprising means for driving, linear motion, sliding, and adjusting.

The driving means are to provide driving force as rotation to rest of the document moving transmission system; the linear motion means are to transform rotation from driving means to a linear motion parallel to one side of the optical scanner and perpendicular to the light transmitting slot; the sliding means utilize the output from the linear motion means to carry the window assembly performing the document moving; and the adjusting means are to provide another support to the window assembly and to maintain flatness of window assembly over the light transmitting slot.

It is another object of the present invention to provide a convenient adjusting mechanism to a document moving system for an optical scanner, who will make the in-site flatness adjustment possible. The adjusting means will be helpful in regulating the flatness of the window assembly over the light transmitting slot, and make the accumulating looseness and manufacturing misalignment fixable in field.

It is a further object of the present invention to provide an economic optical scanner with simple structure, but facilitated with mechanism to ensure the imaging accuracy.

All these objects are achieved by the document moving transmission system for an optical scanner described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a document moving transmission system. The figures illustrate a partially completed optical scanner. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
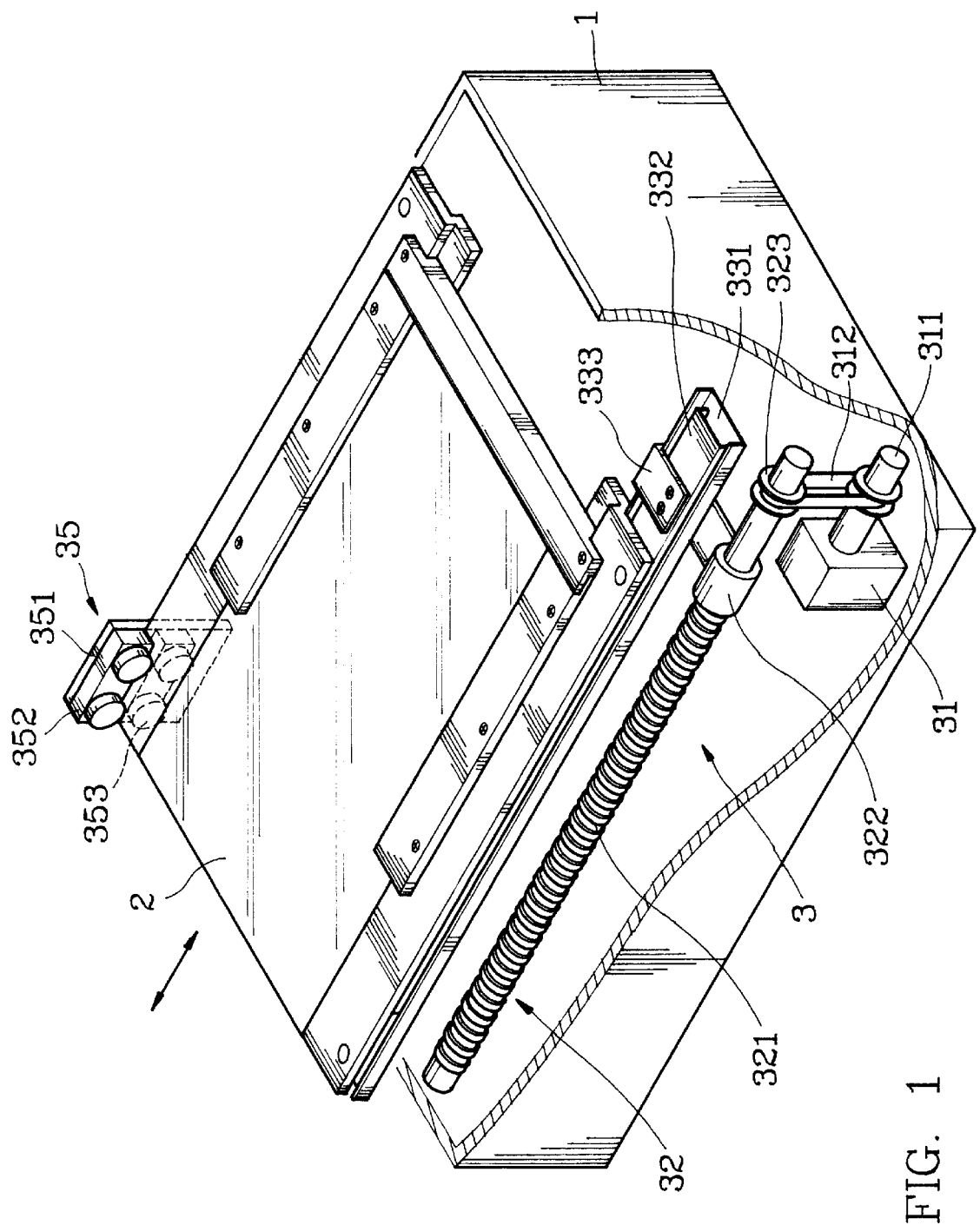
FIG. 1 is a perspective and portion-sectional view of the optical scanner with a document moving transmission system in accordance with the first embodiment of the present invention.
Figure 2:
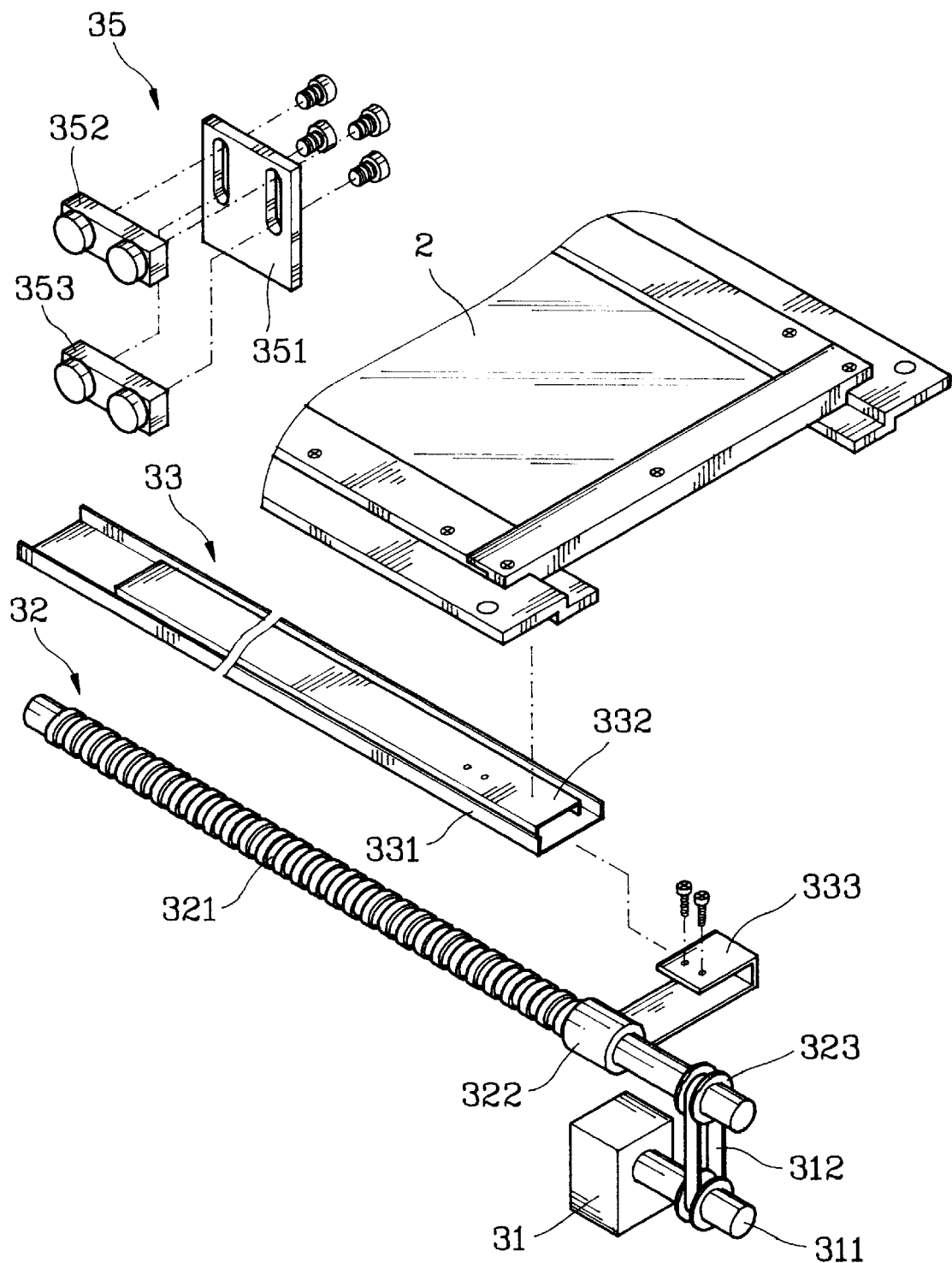
FIG. 2 is an exploded view of the first embodiment of the document moving transmission system shown in FIG. 1.

Referring to FIG. 1 and FIG. 2, a partial-sectional view of an optical scanner utilizing one embodiment of the document moving transmission system 3 according to the present invention and a disassembled view of the embodiment is shown. The document moving transmission system 3 is positioned in the housing 1 of the optical scanner to drive a window assembly 2 mounted on top of the optical scanner, and is designed to adjust and maintain the flatness of the window assembly 1 over the light transmitting slot of the optical scanner.

The document moving transmission system 3 in accordance with the present invention comprises driving means 31, linear motion means 32, sliding means 33, and adjusting means 35.

The driving means 31 are to provide driving force as rotation to rest of the document moving transmission system 3. In the preferred embodiment, the driving means 31 further comprise a motor for providing the rotation and an output shaft 311 to proceed motion transferred via a pulley mounted at end of the output shaft 311.

The linear motion means 32 are to transform aforesaid rotation from the driving means 31 to a linear motion parallel to one side of said optical scanner (L-side, thereafter) and perpendicular to the light transmitting slot of the optical scanner (who is located inside the housing 1 and perpendicular close to the edge of the housing 1 where the number "2" is labeled). In the preferred embodiment shown in FIG. 1 and FIG. 2, the linear motion means 32 are fulfilled by a lead screw set. The lead screw set further comprises a lead screw 321 positioned parallel to the L-side of the optical scanner 1, a slider 322 as linear motion output to go with the lead screw 321, a pulley 323 mounted at end of the lead screw 321, and a transmission belt 312 to synchronize motion between the pulley 323 and the pulley mounted at end of the output shaft 311.

The sliding means 33, driven by the linear motion means 32 via a connected sliding arm 333, are for carrying the window assembly 2 to slide parallel to the L-side of the optical scanner over its light transmitting slot in the housing 1. In the preferred embodiment of the present invention, the sliding means are realized through a sliding part and a fixed part; where the fixed part is fixedly mounted along the L-side of the optical scanner, and the sliding part gliding over the fixed part along the longitudinal direction of the fixed part is driven by the linear motion means 32.

As shown in FIG. 1 and FIG. 2, the fixed part of the sliding means 33 is an extended sliding slot 331 with its longitudinal direction along the L-side of the optical scanner, and the sliding part is a sliding bar 332 gliding restrainedly along the sliding slot 331 and with fixed connection on top to one side frame of the window assembly 2. Thus, the sliding bar 332 is driven by the linear motion means 32 through the sliding arm 333, which is fixed to the sliding bar 332 at one end and to the slider 322 at another end, and drives the window assembly 2 which is fixed at one side frame to top of the sliding bar 332.

The adjusting means 35 are for the purpose of supporting one side (R-side, thereafter) of the window assembly 2 and maintaining flatness of the window assembly 2 over the light transmitting slot. In the preferred embodiment illustrated in FIG. 2, the adjusting means 35 comprise a back plate 351, an upper adjusting block 352, and a lower adjusting block 353.

The back plate 351 is located up-right at the R-side of the optical scanner and opposite to the L-side, extrudes over the surface of the window assembly 2, and further consists of at least a straight slot in the middle of the back plate 351.

The upper adjusting block 352 is mounted to the upright surface of the back plate 351, is fastened by at least a screw set through the straight slot, is located at an elevation higher than the tipper surface of the window assembly 2, further includes at least two rollers mounted to the upright surface of the upper adjusting block 352 with the rollers' bottom edges close to the upper surface of the window assembly 2.

On the other hand, with similar formulation, the lower adjusting block 353 is mounted to the upright surface of the back plate 351, is fastened by at least a screw set through the straight slot, is located at an elevation lower than the bottom surface of the window assembly 2, and further includes at two rollers mounted to the upright surface of the lower adjusting block 353 with the rollers' top edges close to the lower surface of the window assembly 2.

Figure 3:
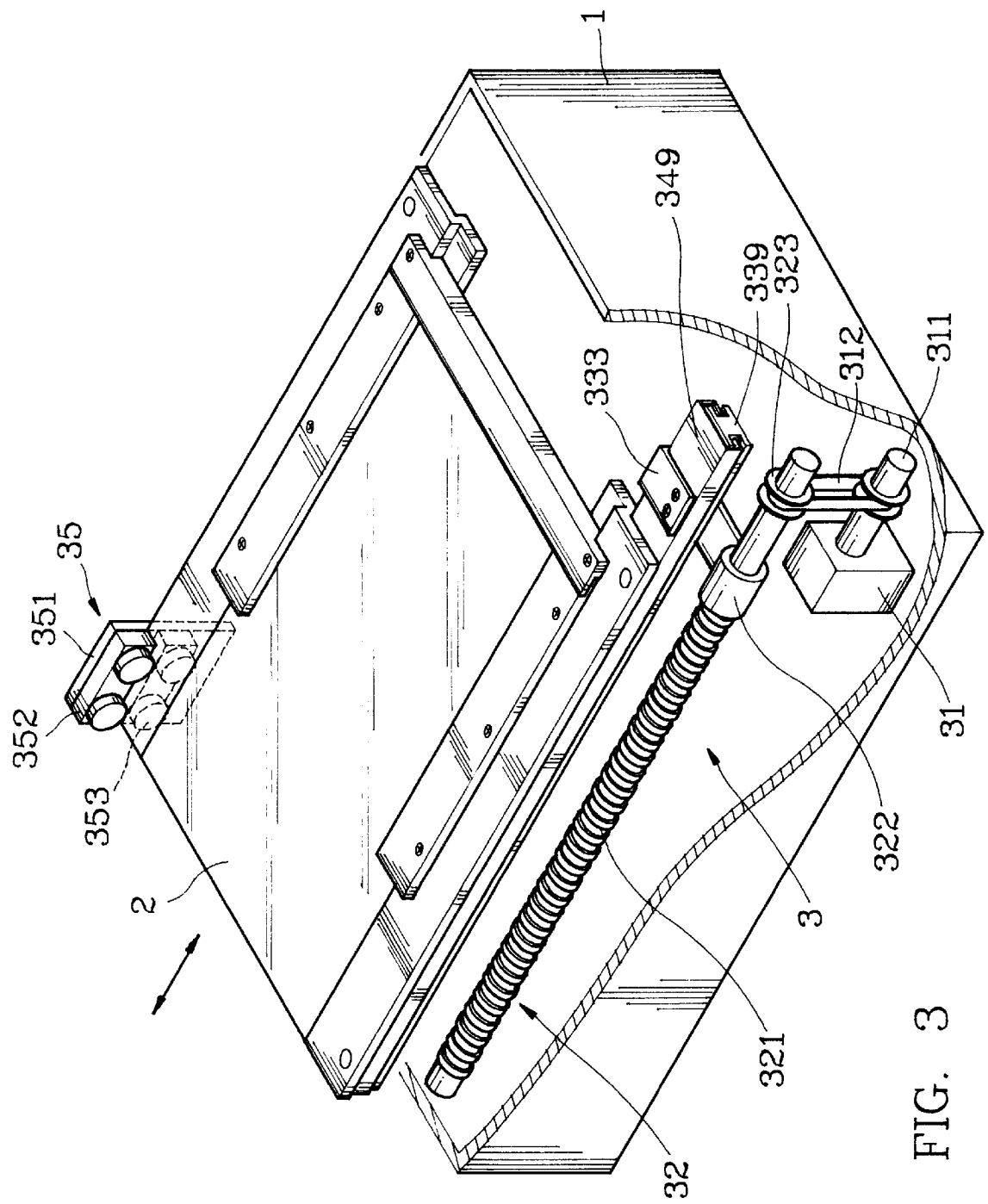
FIG. 3 illustrates a perspective and portion-sectional view of the optical scanner with a document moving transmission system in accordance with the second embodiment of the present invention.

Referring now to FIG. 3, a perspective and portion-sectional view of an optical scanner which utilizes another embodiment of the document moving transmission system for an optical scanner according to the present invention is illustrated. In this embodiment, the sliding means 33 is fulfilled with another combination of the fixed part and sliding part. The fixed part is a straight sliding track 339 with its longitudinal direction along the L-side of the optical scanner, and the sliding part is a sliding platform 349 gliding restrainedly along the sliding track 339 with a fixed connection on top to one side frame of the window assembly 2. Similar to previous embodiment illustrated in FIG. 1 and FIG. 2, the sliding platform 349 is driven by the linear motion means 32 through the sliding arm 333, which is fixed to the sliding platform 349 at one end and to the slider 322 at another end, and drives the window assembly 2 which is fixed at one side frame to top of the sliding platfonn 349.

While the present invention in application, the sliding part of the sliding means 33 will slide along the fixed part to drive one of side frames of the window assembly 2 horizontally, at the same time, with opposite side frame of the window assembly 2 hold between rollers of the upper adjusting block 352 and the lower adjusting block 353 of the adjusting means 35. In case of re-adjusting is necessary, the upper adjusting block 352 and the lower adjusting block 353 can easily be moved up and down, through adjusting the screw sets of the adjusting means 35, to a satisfied location where the flatness of the window assembly 2 can be accurately maintained over the light transmitting slot. Thus, the in-site re-adjusting on the flatness of the window assembly 2 is possible and the imaging quality of the optical scanner can be ensured.

While the present invention has been particularly shown and described with reference to a preferred embodiment, it will be understood by those skilled in the art that various changes in form and detail may be without departing from the spirit and scope of the present invention.

What we claimed is:

1. A document moving transmission system for use in an optical scanner, said optical scanner having a window assembly and a light transmitting slot, said document moving transmission system comprising:

driving means for providing a driving force as a rotation to said document moving transmission system;

linear motion means for transforming said rotation from said driving means into a linear motion parallel to one side of said optical scanner and perpendicular to the light transmitting slot;

sliding means, driven by said linear motion means, for carrying one side of the window assembly to perform a sliding motion over said light transmitting slot; and adjusting means for supporting the other said of the window assembly and for maintaining flatness of the window assembly over said the transmitting slot;

wherein said adjusting means comprises:

one back plate, located up-right a first side of the optical scanner and opposite to a second side, extruding over the surface of said window assembly and further comprising at least a straight slot in the middle of said back plate;

one upper adjusting block mounted to the upright surface of the back plate at an elevation higher than the upper surface of the window assembly, fastened by at least a screw set through the straight slot, further including at least two rollers mounted to the upright surface of the upper adjusting block with rollers' bottom edges close to the upper surface of the window assembly; and one lower adjusting block, mounted to the upright surface of the back plate at an elevation lower than the bottom surface of the window assembly, fastened by at least a screw set through the straight slot, further including at least two rollers mounted to the upright surface of the lower adjusting block with rollers' top edges close to the bottom surface of the window assembly.

2. The document moving transmission system for use in an optical scanner according to claim 1, wherein said sliding means further comprise a sliding part and a fixed part; further wherein said fixed part is fixedly mounted along the said second side of the optical scanner, and said sliding part gliding over the fixed part along the longitudinal direction of the fixed part is driven by said linear motion means via a sliding arm connected with said sliding part and the linear motion means.

3. The document moving transmission system for use in an optical scanner according to claim 2, wherein said fixed part of the sliding means is an extended sliding slot with its longitudinal direction along said second side of the optical scanner, and said sliding part is a sliding bar gliding restrainedly along said sliding slot with one side frame of said window assembly fixed on top of said sliding bar.

4. The document moving transmission system for use in an optical scanner according to claim 2, wherein said fixed part of the sliding means is a straight sliding track with its longitudinal direction along said second side of the optical scanner, and said sliding part is a sliding platform gliding restrainedly along said sliding track with one side frame of said window assembly fixed on top of said sliding platform.

* * * * *